UNITED STATES PATENT OFFICE.

JOHN GRAY, OF SANTA FÉ, TERRITORY OF NEW MEXICO.

LINIMENT.

SPECIFICATION forming part of Letters Patent No. 374,958, dated December 20, 1887.

Application filed September 22, 1887. Serial No. 250,432. (No specimens.)

*To all whom it may concern:*

Be it known that I, JOHN GRAY, a citizen of the United States, residing at Santa Fé, in the county of Santa Fé and Territory of New Mexico, have invented a new and useful Improvement in Liniment Compounds, of which the following is a specification.

My composition consists of the following ingredients combined in the following proportions: common lard, four parts; spirits of turpentine, two parts; spirits of camphor, two parts; tincture of lobelia, one part.

The lard is melted and heated to a high degree, and the other ingredients are then mixed in the proportions stated and added to the heated lard. The added ingredients are then thoroughly mingled with the lard and the mixture is set aside to harden.

The compound is designed to be used as a liniment to be applied with a rag or piece of flannel to cuts, bruises, swellings, and also parts affected with rheumatism or neuralgia.

When the liniment is applied for rheumatism or neuralgia, it is preferably placed upon a flannel cloth and the affected part rubbed therewith.

This liniment is peculiarly adapted for use on horses, cattle, &c., but may be applied universally for the affections mentioned.

Having thus described my invention, I claim—

The herein-described composition of matter to be used as a liniment, comprising lard, spirits of turpentine, spirits of camphor, and tincture of lobelia, in the proportions substantially as described.

In testimony that I claim the foregoing as my own I have hereto affixed my signature in presence of two witnesses.

JOHN GRAY.

Witnesses:
  GEORGE L. WYLLYS,
  HENRY J. GORE.